US005449389A

United States Patent [19]

Yoshizumi et al.

[11] Patent Number: 5,449,389

[45] Date of Patent: Sep. 12, 1995

[54] PROCESS FOR PRODUCTION OF FINE α-ALUMINA POWDER

[75] Inventors: Motohiko Yoshizumi; Hisae Hirako, both of Omiya, Japan

[73] Assignee: Mitsubishi Materials Corporation, Tokyo, Japan

[21] Appl. No.: 146,841

[22] Filed: Jan. 28, 1993

Related U.S. Application Data

[63] Continuation of Ser. No. 790,077, Nov. 13, 1991, abandoned, which is a continuation of Ser. No. 572,230, Aug. 24, 1990, abandoned.

[30] Foreign Application Priority Data

Aug. 25, 1989 [JP] Japan .................................. 1-219860

[51] Int. Cl.[6] .................................................. C09C 1/68

[52] U.S. Cl. ...................................... 51/308; 501/127; 501/153; 423/600; 423/625; 423/628

[58] Field of Search ................ 501/127, 153; 423/600, 423/625, 628; 51/308

[56] References Cited

U.S. PATENT DOCUMENTS

| | | | |
|---|---|---|---|
| 2,702,750 | 2/1955 | George | 501/153 |
| 3,486,849 | 12/1969 | Gatti | 423/625 |
| 3,619,131 | 11/1971 | Grabmaier | 423/600 |
| 4,169,883 | 10/1979 | Murrell et al. | 423/628 |
| 4,937,062 | 6/1990 | Jordan et al. | 423/592 |
| 4,946,664 | 8/1990 | Van Zyl et al. | 423/600 |

FOREIGN PATENT DOCUMENTS

| | | | |
|---|---|---|---|
| 2651225 | 9/1991 | France | C04B 35/10 |
| 3827898 | 2/1990 | Germany . | |
| 45-3537 | of 1970 | Japan | 423/625 |
| 2236525 | 10/1991 | United Kingdom | C01F 7/02 |

OTHER PUBLICATIONS

"X-Ray Diffraction Examination of Gamma Alumina" Feb. 1945 pp. 158–163 M. H. Jellinek et al Industrial & Engineering Chem.

*Primary Examiner*—Mark L. Bell
*Assistant Examiner*—Deborah Jones
*Attorney, Agent, or Firm*—Leydig, Voit & Mayer

[57] ABSTRACT

A process for production of a fine alpha-alumina powder having a specific surface area of not smaller than 10 $m^2/g$ and superior polishing characteristics is provided, the process comprising heat-treating a mixture of gamma-alumina powder and silica at a temperature at which gamma-alumina is converted to alpha-alumina in the presence of silica, wherein the mixture contains not more than about 10 wt % of silica, based on the weight of the gamma-alumina.

13 Claims, No Drawings

PROCESS FOR PRODUCTION OF FINE α-ALUMINA POWDER

This application is continuation of Ser. No. 07/790,077, filed Nov. 13, 1991, now abandoned, which is a continuation of Ser. No. 07/572,230, filed Aug. 24, 1990, now abandoned.

BACKGROUND OF THE INVENTION

(RANGE OF INDUSTRIAL APPLICATION)

This invention relates to a production process of fine α-alumina powder of a uniform size with superior hardness properties and polishing characteristics.

(CONVENTIONAL TECHNIQUES AND THEIR PROBLEMS)

Grinding and polishing material or the like are one of the applications of alumina known at present. As more precise polishing is demanded, α-alumina for polishing materials is required to be fine and uniform in size. In general, α-alumina powder produced by so called Bayer process is used, that is, sodium aluminate obtained in normal wet process is neutralized with acid to form aluminum hydroxide, which in turn is heat-treated to alumina at a high temperature (1,200° C. or higher). In this production process where aluminum hydroxide is formed and heat-treated, however, the alumina particles are not uniform in size, and because of heating at 1,200° C. or higher for a long time the particles become coarse ones with a specific surface area under $10M^2/g$ as a result of sintering of them with each other. It is known that α-alumina powder can also be obtained by processing aluminum hydroxide at a high temperature which has been formed by hydrolysis of aluminum alcohoxide such as, for example, aluminum isopropoxide. Due to the necessary heat-treatment at high temperature, the grain size of powder becomes large also in this process. Up to now, no fine α-alumina powder has been obtained which shows superior polishing characteristics and which has a specific surface are of $10m^2/g$ or more, namely a diameter of 0.15 μm or less if calculated from this specific surface area. Furthermore a powder with superior polishing characteristics must have a high crystallinity. Even if a powder has α-alumina phase only in X-ray diffraction, it has no good polishing characteristics so long as the X-ray peak height was not high.

(OBJECT OF THE INVENTION)

SUMMARY OF THE INVENTION

As a result of continued studies for the object of solving such problems of the conventional techniques as stated above and for providing a process to produce fine α-alumina powder with uniform particle size in addition to superior hardness properties and polishing characteristics, the inventors came up with this invention after finding that said object can be attained by heat-treatment of γ-alumina powder together with silica.

(CONSTITUTION OF THE INVENTION)

That is to say, this invention provides fine α-alumina powder with a specific surface area of $10m^2/g$ or more and superior polishing characteristics by heat-treatment of γ-alumina powder together with silica added to it for restraining grain growth of α-alumina powder having been formed. For said handling and heat-treatment process, it is suitable to granulate the powder in advance to 100–200 μm. Although a slight aggregation is to be seen after heat-treatment, the required fine α-alumina can be obtained by loosening such aggregate lightly.

DESCRIPTION OF THE INVENTION

As mentioned above, the inventors found as a result of studies that the grain growth of α-alumina can be restrained by heat-treatment of α-alumina together with silica added. Conversion from γ- to α-alumina proceeds by the grain growth of α-alumina nuclei which have first been formed. It is inevitable, therefore, that α-alumina particles become large when the conversion has once begun. If silica is added, however, a great number of nuclei are formed which supposedly restrain such growth of α-alumina. Because of lower hardness, γ-alumina is not applicable to polishing, while α-alumina having a Mohs' hardness of 9 is used for polishing. γ-alumina means here alumina formed at a low temperature and represents generally δ-, γ-, Θ-, κ- and other similar aluminas with relation to X-ray diffraction.

α-alumina, according to this invention, contains silica as a matter of course, so that it cannot be employed as ceramic materials to which higher purity requirement is set. On the other hand, containing silica is no problem for polishing materials. Conversion from γ- to α-alumina is conducted usually by heat-treatment of the former at a high temperature between 1,100° and 1,310° C. It takes longer if the temperature is lower and shorter and if higher. In either case, α-alumina particles once formed grow to those with a specific surface area of $10m^2/g$ or less. Even over $10m^2/g$ as the case may be, the crystallinity is unsatisfactory. Although particles with a specific surface area of $10m^2/g$ or more can be formed also by heat-treatment at a low temperature below 1,100 or by short heat-treatment at high temperature, they are not fully converted to α-alumina or low crystalline $\alpha$-$Al_2O_3$, and thus they are inferior in polishing characteristics either due to remaining γ-alumina or because of low crystallinity. That is to say, it is difficult to obtain powder without silica which shows high peak of α-alumina in X-ray diffraction and also has a specific surface area of $10m^2/g$ or more. As mentioned above, this invention has made it possible to obtain fine α-alumina powder with high crystallinity and a specific surface area of $10m^2/g$ or more by heat-treatment of γ-alumina powder with silica added to it and thus by restraining grain growth of α-alumina. α-alumina powder with a specific surface area below $10m^2/g$ is too large for polishing to easily cause a scratch on the surface being polished. A specific surface area of $10m^2/g$ or more is, therefore, indispensable to polishing. The concrete range of silica addition and heat-treatment temperature for obtaining the required α-alumina powder on the basis of this invention is as indicated in Table 1 according to the practical examples given later. The polishing effect on metal aluminum plate was examined using α-alumina powder as given in Table 1. The polishing

TABLE 1

| | Silica addition (% by wt.) | Heat-treatment temp. (°C.) |
|---|---|---|
| (a) | 1–2 | 1,100–1,230 |
| (b) | 2–4 | 1,120–1,270 |
| (c) | 4–7 | 1,130–1,280 |
| (d) | 7–9 | 1,170–1,290 |

TABLE 1-continued

| | Silica addition (% by wt.) | Heat-treatment temp. (°C.) |
|---|---|---|
| (e) | 9-10 | 1,210-1,310 |

rate was low in the case of powder with γ-alumina residue and the polishing surface was scratched in the case of powder with a specific surface area below $10m^2/g$.

With fine a-alumina Powder based on this invention, however, the polishing rate was twice as high as that with powder containing γ-alumina residue, and a smoothly polished surface without any scratch was obtained.

In the relationship of heat-treatment temperature to silica addition as given in Table 1, the conversion to α-alumina takes much time in case of heat-treatment under the lower limit temperature for the respective silica addition, while the specific surface area of α-alumina powder becomes smaller than $10m^2/g$ if the heat-treatment temperature exceeds the upper limit.

The invention is explained concretely in the following in accordance with a practical example.

EXAMPLE 100 g alumina powder obtained by oxyhydrogen flame reaction of aluminum trichloride (Aluminum Oxide C produced by Degussa) was mixed sufficiently with silica (Aerosil 200 from Nippon Aerosil Co., Ltd.) added to it in accordance with Table 1. Next, it was mixed with 250 ml water containing 25 g polyvinyl alcohol and dried at 110° C. By sieving while crushing lightly, granules with a size between 100 and 200 μm were obtained.

They were heat-treated at 1,100° C., 1,150° C., 1,200° C.,

TABLE 2

| Heat-treatment temperature (°C.) Silica addition (%) | 1,100 | 1,150 | 1,200 | 1,250 | 1,360 |
|---|---|---|---|---|---|
| 0 | 40* | 20* | 8 | 1 | <1 |
| 1 | 40* | 15 | 12 | 6 | <1 |
| 3 | 50* | 25 | 18 | 12 | <1 |
| 5 | — | 30 | 25 | 17 | — |
| 6 | 70* | 33 | 28 | 18 | 4 |
| 8 | 70* | 35* | 30 | 20 | 8 |
| 10 | 80* | 40* | 35* | 23 | 11 |

*with γ-alumina residue 1,250° C. and 1,300° C. respectively for 6 hours. After loosening it lightly, the specific surface area was measured with the results as given in Table 2.

(EFFECTS OF THE INVENTION)

As described above, this invention provides a process for obtaining uniform and fine α-alumina powder with superior polishing characteristics due to a large specific surface area of $10m^2/g$ or more by restraining the grain growth of α-alumina through heat-treatment of γ-alumina together with silica added to it, namely through maintenance of the relation between silica addition and heat-treatment temperature within a certain range.

We claim:

1. A process for production of a fine α-alumina powder having a specific surface area of 10 $m^2/g$ or more and superior polishing characteristics comprising heat-treating a mixture of γ-alumina powder and 1-10 wt %, based on the weight of the γ-alumina powder, of fine silica powder at a temperature of 1,100°-1,310° C.

2. A process as claimed in claim 1 wherein said γ-alumina powder mixture is heat-treated at 1,100°-1,230° C. with 1-2% silica by weight based on the weight of the γ-alumina powder.

3. A process as claimed in claim 1 wherein said γ-alumina powder mixture is heat-treated at 1,120°-1,270° C. with 2-4% silica by weight based on the weight of the γ-alumina powder.

4. A process as claimed in claim 1 wherein said γ-alumina powder mixture is heat-treated at 1,130°-1,280° C. with 4-7% silica by weight based on the weight of the γ-alumina powder.

5. A process as claimed in claim 1 wherein said γ-alumina powder mixture is heat-treated at 1,170°-1,290° C. with 7-9% silica by weight based on the weight of the γ-alumina powder.

6. A process as claimed in claim 1 wherein said γ-alumina powder mixture is heat-treated at 1,210°-1,310° C. with 9-10% silica by weight based on the weight of the γ-alumina powder.

7. A process for production of a fine alpha-alumina powder having a specific surface area of not smaller than 10 $m^2/g$ and superior polishing characteristics, the process comprising heat-treating a mixture comprising gamma-alumina powder and silica at a temperature at which gamma-alumina is converted to alpha-alumina in the presence of silica, wherein the mixture contains not more than about 10 wt % of silica, based on the weight of the γ-alumina.

8. A process as claimed in claim 7 wherein said gamma-alumina powder and silica mixture is heat-treated at 1,100°-1,230° C. and the amount of silica in the mixture is 1-2 wt. %, based on the weight of the gamma-alumina.

9. A process as claimed in claim 7 wherein said gamma-alumina powder and silica mixture is heat-treated at 1,120°-1,270° C. and the amount of silica in the mixture is 2-4 wt %, based on the weight of the gamma-alumina.

10. A process as claimed in claim 7 wherein said gamma-alumina powder and silica mixture is heat-treated at 1,130°-1,280° C. and the amount of silica in the mixture is 4-7 wt %, based on the weight of the gamma-alumina.

11. A process as claimed in claim 7 wherein said gamma-alumina powder and silica mixture is heat-treated at 1,170°-1,290° C. and the amount of silica in the mixture is 7-9 wt %, based on the weight of the γ-alumina.

12. A process as claimed in claim 7 wherein said gamma-alumina powder and silica mixture is heat-treated at 1,210°-1,310° C. and the amount of silica in the mixture is 9-10 wt %, based of the weight of the γ-alumina.

13. A process as claimed in claim 7, wherein said gamma-alumina is produced by an oxyhydrogen flame reaction.

* * * * *